(12) United States Patent
Singer et al.

(10) Patent No.: US 12,541,424 B2
(45) Date of Patent: Feb. 3, 2026

(54) UECC BLOCK MAPPING UPDATE TO A BAD BLOCK

(71) Applicant: Sandisk Technologies, Inc., San Jose, CA (US)

(72) Inventors: Nava Singer, Petach tikwa (IL); Adi Dachlika Koplovich, Yokneam Illit (IL)

(73) Assignee: Sandisk Technologies, Inc., Milpitas, CA (US)

( * ) Notice: Subject to any disclaimer, the term of this patent is extended or adjusted under 35 U.S.C. 154(b) by 48 days.

(21) Appl. No.: 18/218,861

(22) Filed: Jul. 6, 2023

(65) Prior Publication Data

US 2024/0289211 A1   Aug. 29, 2024

Related U.S. Application Data

(60) Provisional application No. 63/448,411, filed on Feb. 27, 2023.

(51) Int. Cl.
*G06F 11/00* (2006.01)
*G06F 11/10* (2006.01)

(52) U.S. Cl.
CPC ................. *G06F 11/1012* (2013.01)

(58) Field of Classification Search
CPC ............. G06F 11/1012; G06F 11/1044; G06F 11/1048
See application file for complete search history.

(56) References Cited

U.S. PATENT DOCUMENTS

| 10,545,830 B2 | 1/2020 | Kim et al. |
| 10,769,018 B2 | 9/2020 | Li |
| 11,074,989 B2 | 7/2021 | Huang et al. |
| 2007/0086281 A1* | 4/2007 | Terada ................. G11B 7/0045 369/30.07 |

FOREIGN PATENT DOCUMENTS

| CN | 112948288 A | 6/2021 |
| CN | 113296694 A | 8/2021 |

* cited by examiner

*Primary Examiner* — Katherine Lin
(74) *Attorney, Agent, or Firm* — Patterson + Sheridan, LLP

(57) ABSTRACT

Jumboblocks (JBs) having an uncorrectable error correction code (UECC) error are linked to a bad block in a storage address table (SAT) in order to optimize read and write operations. Bad blocks are designated as a bad block during a manufacturing process or associated with a write uncorrectable error. When a JB is identified as having the UECC error, the controller updates a corresponding mapping of the SAT to point to a bad block, where each JB having the UECC error points to the bad block. When a read command is received by the controller for the data of the JB having the UECC error, the controller scans the SAT, determines, from the SAT, that the JB identification points to the bad block, and returns a UECC message to the requester of the data of the JB having the UECC error.

20 Claims, 6 Drawing Sheets

UECC BLOCK MAPPING UPDATE TO A BAD BLOCK

CROSS-REFERENCE TO RELATED APPLICATIONS

This application claims benefit of U.S. Provisional Patent Application Ser. No. 63/448,411, filed Feb. 27, 2023, which is herein incorporated by reference.

BACKGROUND OF THE DISCLOSURE

Field of the Disclosure

Embodiments of the present disclosure generally relate to data storage devices, such as solid state drives (SSDs), and, more specifically, storage address table (SAT) management.

Description of the Related Art

During a data management operation of a data storage device, such as a garbage collection operation, valid flash management units (FMUs) are copied from a source block or jumboblock (JB) of a memory device to a destination block or destination JB of the memory device or to another memory device of the data storage device. When the valid FMUs are copied to the destination block or destination JB, the source block or source JB is released or erased. In other words, memory storage space, which may be greater than a size of the valid FMUs copied to the source block or source JB due to erasing outdated or invalid data, may be reclaimed. For each FMU, metadata is generated and associated with the respective FMU. The metadata may have a size of about 4 KB, in a non-limiting example. The metadata stores information regarding the FMU, such as a logical block address (LBA) of the FMU. When valid FMUs are copied from the source block or source JB to a destination block or destination JB, a controller updates a mapping of the respective LBAs in a SAT to a new JB address (JBA) (i.e., the destination block or destination JB).

In cases where an uncorrectable error correction code (UECC) error is detected on a source JB, the controller scans the SAT to determine which LBA is associated with the failed JBA and marks the respective marking as having a UECC error. The scanning and the marking may be bandwidth expensive as the operation may require reading control data from the memory device and scanning the control data read from the memory device, which may cause a timeout to occur. Likewise, when a UECC error is detected on a source JB, the controller may save a JB identification (ID) associated with the source JB in a UECC list. The JBs associated with the JB IDs stored in the UECC list may not be allocated in future operations, which may cause the data storage device to enter a read-only mode. Furthermore, after each address translation from the SAT, the controller needs to scan the UECC list to determine if the JB ID exists in the UECC list. Thus, read performance may be impacted.

Therefore, there is a need in the art for an improved storage address table management for uncorrectable error correction code errors.

SUMMARY OF THE DISCLOSURE

The present disclosure generally relates to data storage devices, such as solid state drives (SSDs), and, more specifically, storage address table (SAT) management. Jumboblocks (JBs) having an uncorrectable error correction code (UECC) error are linked to a bad block in the SAT in order to optimize read and write operations. Bad blocks are designated as a bad block during a manufacturing process or associated with a write uncorrectable error. When a JB is identified as having the UECC error, the controller updates a corresponding mapping of the SAT to point to a bad block, where each JB having the UECC error points to the bad block. When a read command is received by the controller for the data of the JB having the UECC error, the controller scans the SAT, determines, from the SAT, that the JB identification points to the bad block, and returns a UECC message to the requester of the data of the JB having the UECC error.

In one embodiment, a data storage device includes a memory device comprising a plurality of jumboblocks (JBs) and a controller coupled to the memory device. The controller is configured to determine that a JB has an uncorrectable error correction code (UECC) error, update a JB identification (ID) corresponding to the JB in a storage address table (SAT) to point to a bad block, where the SAT comprises a plurality of JB IDs, and where one or more JB IDs point to the bad block, and return a UECC message to a requester for the JB responsive to receiving a read command for the JB.

In another embodiment, a data storage device includes a memory device comprising a plurality of jumboblocks (JBs) and a controller coupled to the memory device. The controller is configured to receive a read command for data of a JB from a host device, scan a storage address table (SAT) for a JB identification (ID) corresponding to the JB, determine that the JB ID points to a bad block, where the bad block is not the JB, and return, responsive to the determining, an uncorrectable error correction code (UECC) message to the host device.

In another embodiment, a data storage device includes means for storing data and a controller coupled to the means for storing data. The controller is configured to respond to a read command for data of the means for storing data with a uncorrectable error correction code (UECC) message based on scanning a storage address table (SAT) for a logical block address (LBA) corresponding to the read command, where scanning the SAT comprises determining that an entry having the LBA points to a portion of the means for storing data, and where the portion of the means for storing data indicates a UECC error.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, storage address table (SAT) management. Jumboblocks (JBs) having an uncorrectable error correction code (UECC) error are linked to a bad block in the SAT in order to optimize read and write operations. Bad blocks are designated as a bad block during a manufacturing process or associated with a write uncorrectable error. When a JB is identified as having the UECC error, the controller updates a corresponding mapping of the SAT to point to a bad block, where each JB having the UECC error points to the bad block. When a read command is received by the controller for the data of the JB having the UECC error, the controller scans the SAT, determines, from the SAT, that the JB identification points to the bad block, and returns a UECC message to the requester of the data of the JB having the UECC error.

Figure 1:
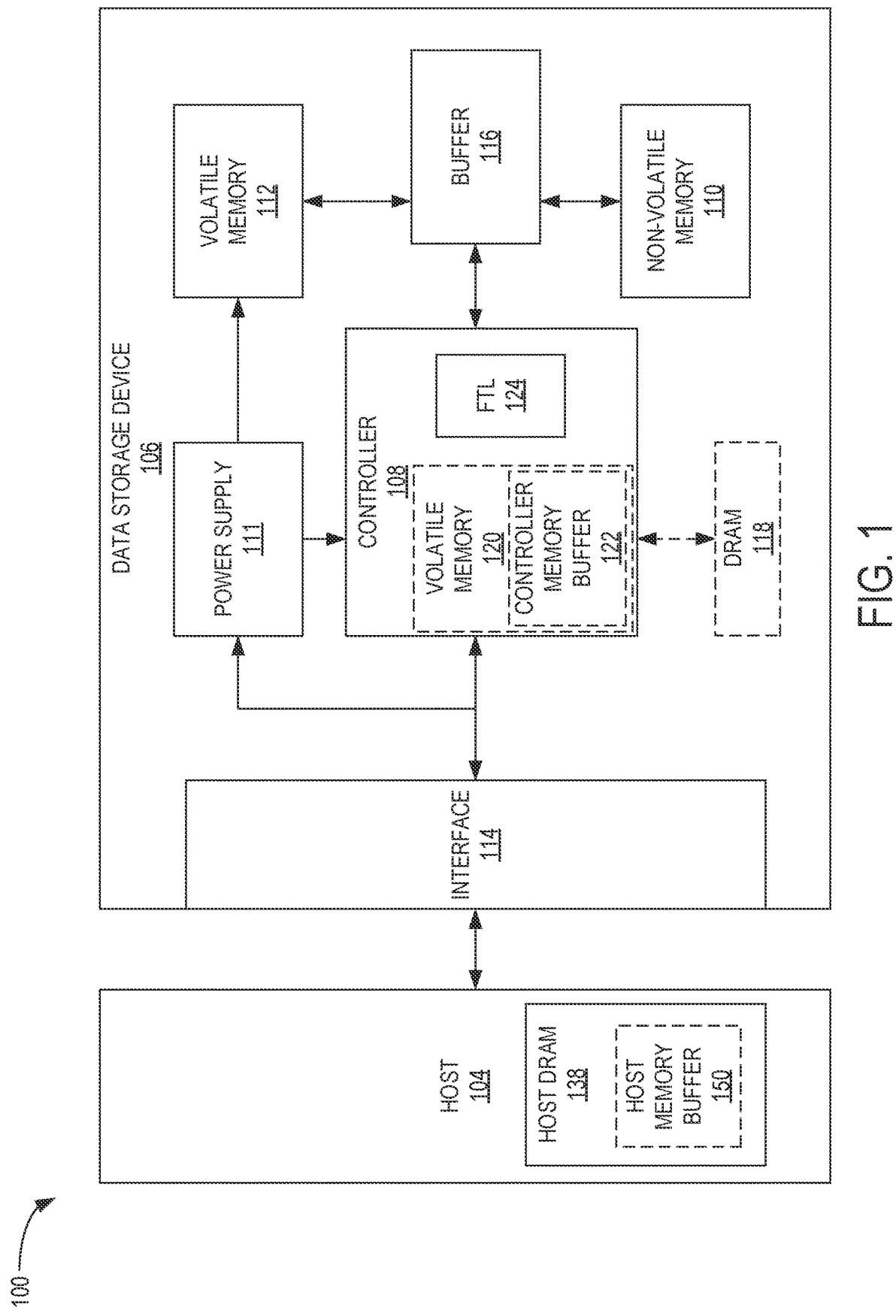
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Controller 108 includes a flash translation layer (FTL) 124. The FTL 124 may be configured to generate an maintain address mappings, such as a mapping from a logical block address (LBA), provided by a host device, to a physical block address (PBA). The LBA is an address utilized by the host device 104 to address data associated with the LBA stored in the data storage device 106. The PBA is an address of a physical location in a corresponding memory device, such as the NVM 110. The LBA to PBA mappings may be stored in a logical-to-physical (L2P) table that is managed by the FTL 124. The L2P table may be referred to as a storage address table (SAT), where portions of the SAT stored in a volatile memory of the controller 108 may be referred to as a compressed address table (CAT). The L2P table may be fully or partially stored in an optional second volatile memory 120, the DRAM 118, the volatile memory 112, the NVM 110, and/or the HMB 150. When data, received from the host device 104, is programmed to the NVM 110, the FTL 124 generates a mapping of the host provided LBA to the PBA. When data is moved from a first location to another location in the NVM 110, such as in a garbage collection operation, the FTL 124 updates a corresponding mapping in the L2P table to reflect the movement of data from the first location to the another location in the NVM 110.

Controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
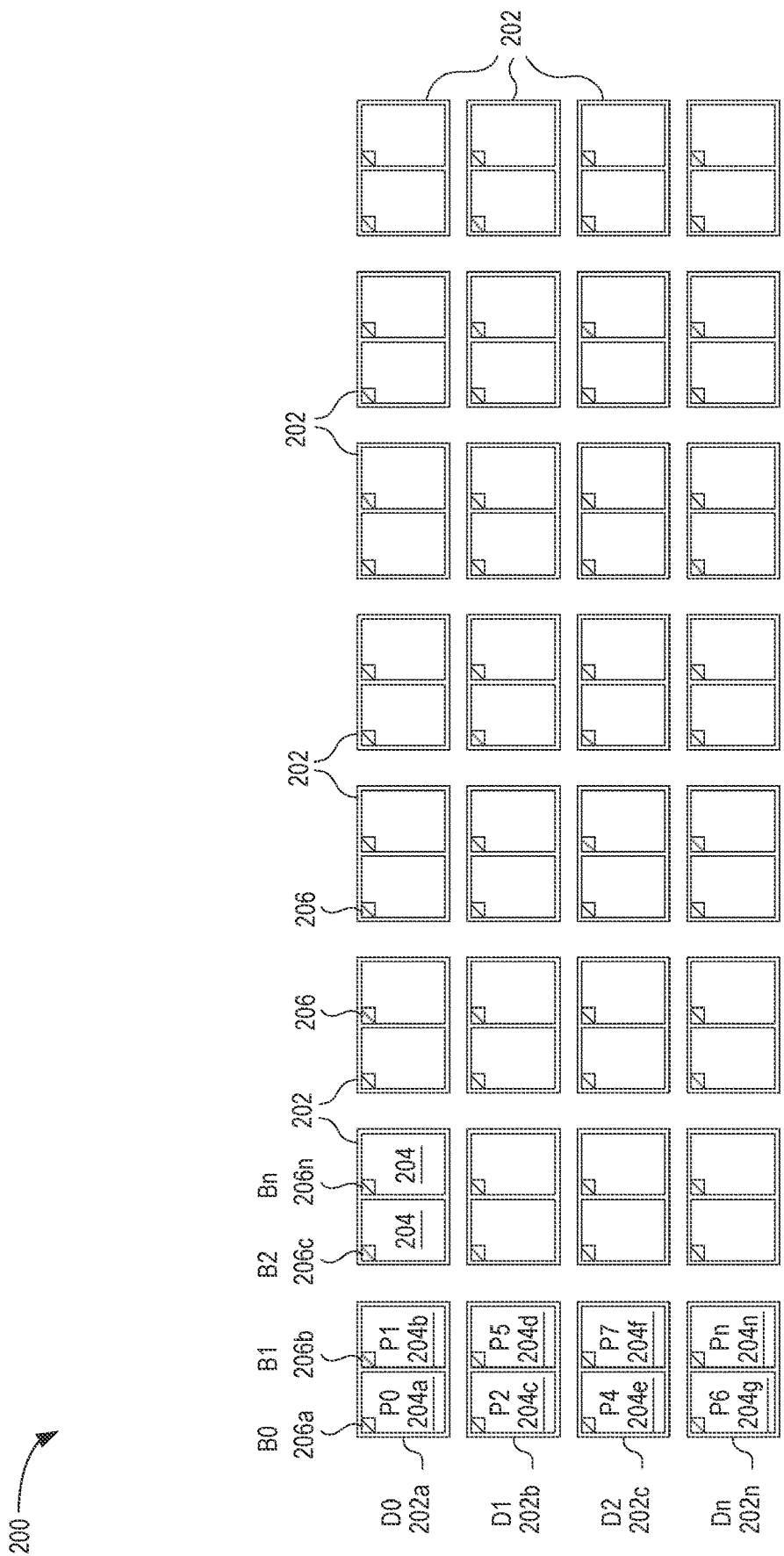
FIG. 2 is an illustration of a memory device, according to certain embodiments.

FIG. 2 is an illustration of a memory device 200, which may be the NVM 110 of FIG. 1, according to certain embodiments. The memory device 200 includes a plurality of dies 202a-202n, collectively referred to as dies 202, where each die of the plurality of dies 202a-202n includes a first plane 204a and a second plane 204b, collectively referred to as planes 204. Each of the planes 204 includes a plurality of blocks 206a-206n, collectively referred to as blocks 206. While 32 dies 202 are shown in the memory device 200, any number of dies may be included. Furthermore, the dies 202 may be split into a plurality of sets of dies, where each of the sets of dies has one or more distinct dies of the plurality of dies 202a-202n. For example, a first die 202a may be in a first set of dies and a second set of dies may include a second die 202b and a third die 202c. Each of the sets of dies may be associated with a flash channel of a controller, such as the controller 108 of FIG. 1. The controller 108 may be configured to read data from and write data to the memory device 200. Likewise, groupings of blocks 206 (which may include one or more blocks from a same die or one or more blocks from one or more dies) may be referred to as a jumboblock (JB). It is to be understood that block, physical block, and JB may be referenced interchangeably herein.

Figure 3:
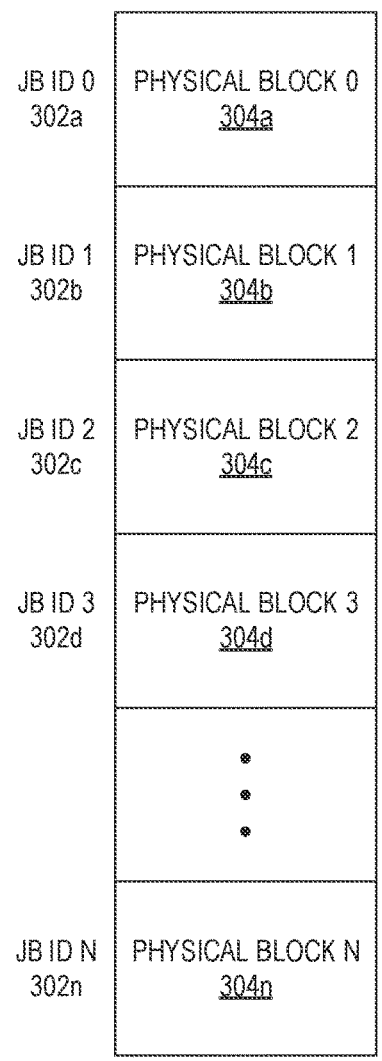
FIG. 3 is a schematic block diagram illustrating a SAT, according to certain embodiments.

FIG. 3 is a schematic block diagram illustrating a SAT 300, according to certain embodiments. The SAT 300 may be managed by a FTL, such as the FTL 124 of FIG. 1. For exemplary purposes, aspects of the storage system 100 of FIG. 1 and the memory device 200 of FIG. 2 may be referenced herein. The SAT 300 includes one or more mappings of a JB identification (ID) (e.g., JB ID 0 302a, JB ID 1 302b, JB ID 2 302c, JB ID 3 302d, and JB ID N 302n) to a corresponding JB or physical block (e.g., physical block 0 304a, physical block 1 304b, physical block 2 304c, physical block 3 304d, and physical block n 304n). It is to be understood that "n" may refer to any relevant number applicable to the described embodiments. Each of the plurality of physical blocks 304a-304n may be a block of plurality of blocks 206a-206n.

Physical block 0 304a is mapped to JB ID 0 302a. When a read command for data of the physical block 0 304a is received by the controller 108, the controller 108 determines a corresponding JB ID associated the LBA provided by the read command by the host device 104 for the data. For example, the LBA provided by the read command corresponds with JB ID 0 302a. The controller 108 then retrieves the data from the physical block 0 304a and provides the data back to the host device 104.

Figure 4:
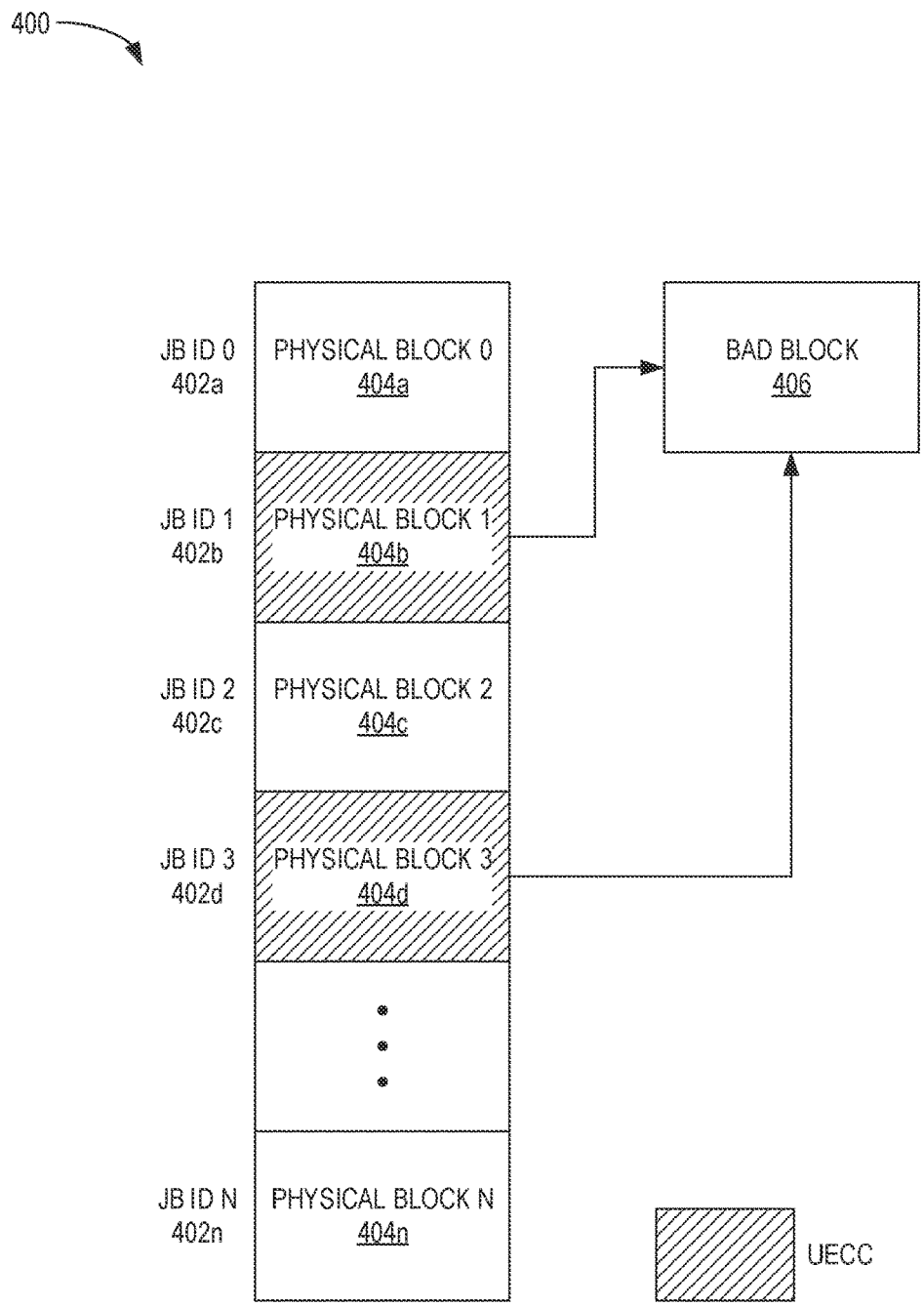
FIG. 4 is a schematic block diagram illustrating a SAT in which physical blocks having a UECC are associated with a bad block, according to certain embodiments.

FIG. 4 is a schematic block diagram illustrating a SAT 400 in which physical blocks having a UECC error are associated with a bad block 406, according to certain embodiments. The SAT 400 may be managed by a FTL, such as the FTL 124 of FIG. 1. For exemplary purposes, aspects of the storage system 100 of FIG. 1 and the memory device 200 of FIG. 2 may be referenced herein. The SAT 400 includes one or more mappings of a JB identification (ID) (e.g., JB ID 0 402a, JB ID 1 402b, JB ID 2 402c, JB ID 3 402d, and JB ID N 402n) to a corresponding JB or physical block (e.g., physical block 0 404a, physical block 1 404b, physical block 2 404c, physical block 3 404d, and physical block n 404n). It is to be understood that "n" may refer to any relevant number applicable to the described embodiments. Each of the plurality of physical blocks 404a-404n may be a block of plurality of blocks 206a-206n.

During operation of the data storage device 106, the controller 108 may perform data management operations, such as garbage collection, wear leveling, and the like. It is to be understood that the previously described data management operations are not intended to be limiting, but to provide an example of a possible embodiment. When the controller 108 performs a relocation operation on data stored in the NVM 110, the controller 108 may determine that the data has an uncorrectable error correction code (UECC) error. For example, a decoder of the controller 108 may fail to decode the data due to too many errors existing in the data. It is to be understood that reference to a UECC error is merely for exemplary purposes, and aspects of the disclosure may be applicable to other contemplated data errors/corruptions.

When the controller 108 determines that data stored in a physical block (e.g., a jumboblock) has a UECC error, the corresponding mapping in the SAT or the L2P table is updated, by the controller 108 or the FTL 124, so that the JB ID associated with the physical block points to a bad block 406. A block may be designated as the bad block 406 during a first mount operation after production of the memory device. For example, the first mount operation may be an initial scan of the memory device to determine which blocks are good and which blocks are defective or bad. The bad block 406 is associated with a write uncorrectable error. In another example, a block may be designated as the bad block 406 upon determining that the block has a write uncorrectable error during data storage device operation. For example, the block may be deallocated due to a wear leveling statistic, a program erase cycle count, a number of program failures, a number of read failures, and the like. In yet another example, a dedicated block, during data storage device operation, may be designated as the bad block 406.

When a block is designated as the bad block 406, the block is associated with a write uncorrectable error, which may cause the controller 108 to return a UECC message to a requester for the block. As shown in FIG. 4, physical block 1 404b has a UECC error. The controller 108 or the FTL 124 updates the corresponding mapping in the L2P table or the SAT to have JB ID 1 402b, which is associated with physical block 1 404b, to point to the bad block 406. Likewise, physical block 3 404d is determined to have a UECC error. The controller 108 or the FTL 124 updates the corresponding mapping in the L2P table or the SAT to have JB ID 3 402d, which is associated with physical block 3 404d, to point to the bad block 406. In other words, each JB ID mapping corresponding to a physical block having a UECC error points to the bad block 406. Furthermore, the data of the physical block having the UECC error may not be moved to a different block due to the data being corrupted.

In one example, the bad block 406 is a single bad block. In another example, the bad block is a plurality of bad blocks, where a JB ID mapping corresponding to a physical block having a UECC error points any of the plurality of bad blocks. By updating the mapping of JB IDs being associated with a physical block having a UECC error to point to the bad block 406, a UECC list may not need to be maintained. Thus, during operation of the data storage device, the controller 108 may not need to scan both the SAT (or the L2P table) and the UECC list. Likewise, metadata associated with the physical block having the UECC error may not need to be scanned and read in order to determine whether the physical block has a UECC error.

Figure 5:
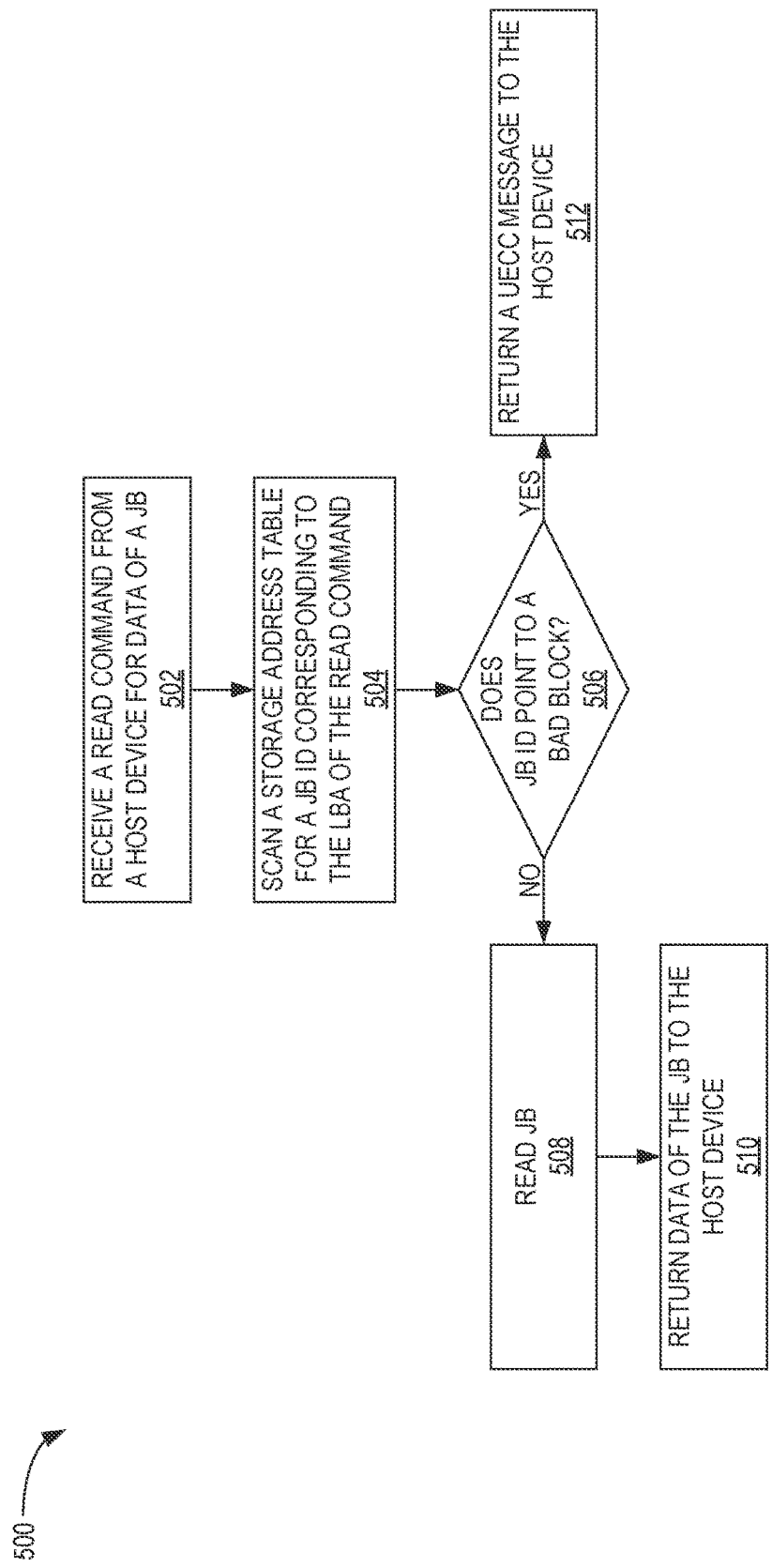
FIG. 5 is a flow diagram illustrating a method of performing a read operation, according to certain embodiments.

FIG. 5 is a flow diagram illustrating a method 500 of performing a read operation, according to certain embodiments. Method 500 may be implemented by a controller, such as the controller 108 of FIG. 1. For exemplary purposes, aspects of the storage system 100 of FIG. 1 and the SAT 400 of FIG. 4 may be referenced herein.

At block 502, the controller 108 receives a read command from the host device 104 for data of a JB, which may be physical block 1 404*b*. At block 504, the controller 108 scans the SAT 400 for the JB ID corresponding to LBA of the read command. At block 506, the controller 108 determines if the mapping found at block 504 points to the bad block 406. If the mapping does not point to the bad block 406 at block 506, then the controller 108 reads the corresponding data from the JB at block 508. At block 510, the data from the JB is provided back to the host device 104. However, if the mapping does point to the bad block 406 at block 506, then the controller 108 returns a UECC message to the host device 104 at block 512.

Figure 6:
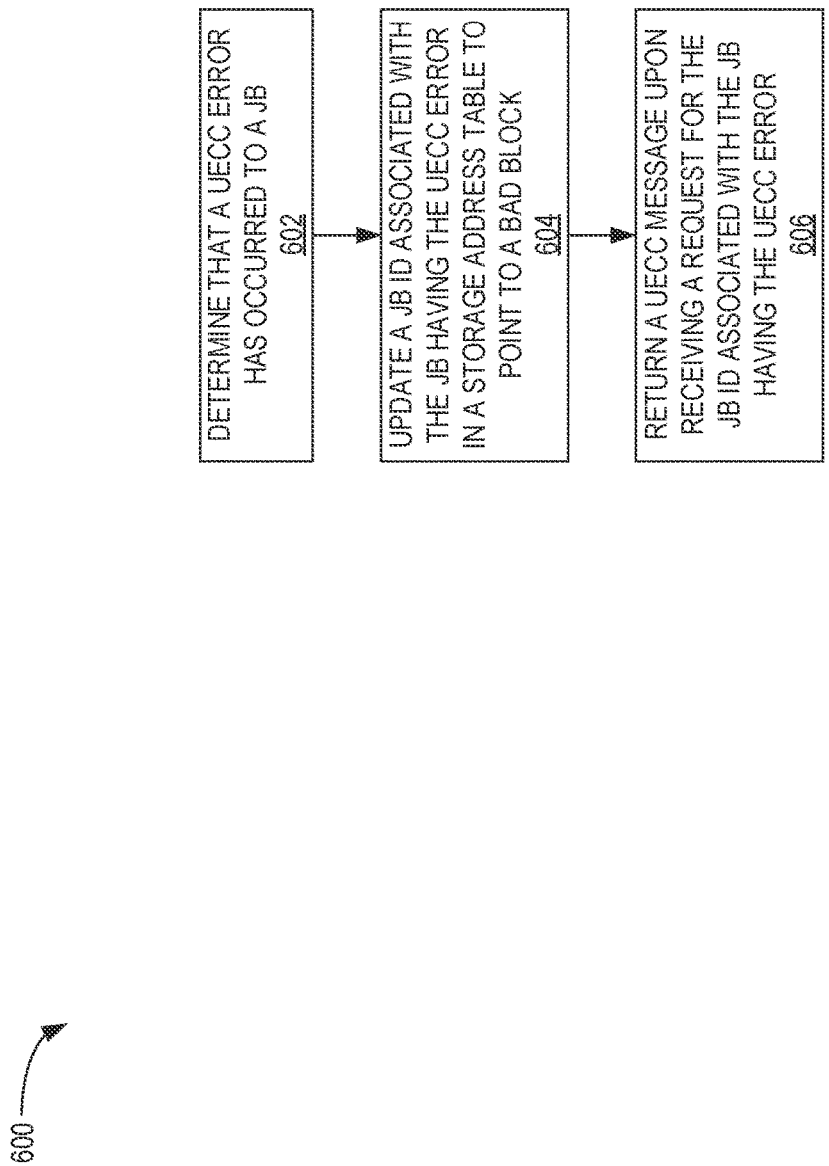
FIG. 6 is a flow diagram illustrating a method of updating a SAT, according to certain embodiments.

FIG. 6 is a flow diagram illustrating a method 600 of updating a SAT, according to certain embodiments. Method 600 may be implemented by a controller, such as the controller 108 of FIG. 1. For exemplary purposes, aspects of the storage system 100 of FIG. 1 and the SAT 400 of FIG. 4 may be referenced herein.

At block 602, the controller 108 determines that a UECC error has occurred to a JB, such as physical block 3 404*d*. At block 604, the FTL 124 updates a mapping in the SAT 400, where the JB ID, JB ID 3 402*d*, corresponding to the physical block 3 404*d* having the UECC error is updated to point to the bad block 406. At block 606, the controller 108 returns a UECC message to a requester upon receiving a read command for data associated with a JB whose JB ID points to the bad block 406.

By updating a pointer of a jumboblock identification associated with a jumboblock having an uncorrectable error correction code error in a storage address table, address translation requests may be optimized and data storage device performance may be improved.

In one embodiment, a data storage device includes a memory device comprising a plurality of jumboblocks (JBs) and a controller coupled to the memory device. The controller is configured to determine that a JB has an uncorrectable error correction code (UECC) error, update a JB identification (ID) corresponding to the JB in a storage address table (SAT) to point to a bad block, where the SAT comprises a plurality of JB IDs, and where one or more JB IDs point to the bad block, and return a UECC message to a requester for the JB responsive to receiving a read command for the JB.

The bad block is a write uncorrectable block. The bad block is a manufactured bad block. The controller is further configured to receive the read command from a host device for the JB, scan the SAT for a logical block address (LBA) associated with the read command for the JB, and return the UECC message to the host device responsive to locating the LBA associated with the read command. Data of the JB is not read prior to scanning the SAT for the LBA associated with the read command for the JB. The controller is further configured to determine that a second JB has the UECC error and update a second JB ID corresponding to the second JB in the SAT to point to the bad block. The controller is further configured to receive a second read command from a host device for the second JB, scan the SAT for a logical block address (LBA) associated with the second read command for the second JB, and return the UECC message to the host device responsive to locating the LBA associated with the second read command. Data of the JB is not moved to another JB. The JB ID is not removed from the SAT. A UECC list storing logical block address (LBA) to physical block address (PBA) is not scanned for an address translation request.

In another embodiment, a data storage device includes a memory device comprising a plurality of jumboblocks (JBs) and a controller coupled to the memory device. The controller is configured to receive a read command for data of a JB from a host device, scan a storage address table (SAT) for a JB identification (ID) corresponding to the JB, determine that the JB ID points to a bad block, where the bad block is not the JB, and return, responsive to the determining, an uncorrectable error correction code (UECC) message to the host device.

The JB ID corresponds to a logical block address (LBA) provided by the host device in the read command. The SAT comprises two or more JB IDs pointing to the bad block. The JB ID is not relocated to a UECC list. The controller is further configured to perform a garbage collection operation on a second JB, determine that the second JB has a UECC error, and change a pointer in the SAT corresponding to the second JB to point to the bad block. The read command is a random read command. The bad block is an allocated dedicated block written with write uncorrectable. The bad block is identified with a UECC error.

In another embodiment, a data storage device includes means for storing data and a controller coupled to the means for storing data. The controller is configured to respond to a read command for data of the means for storing data with a uncorrectable error correction code (UECC) message based on scanning a storage address table (SAT) for a logical block address (LBA) corresponding to the read command, where scanning the SAT comprises determining that an entry having the LBA points to a portion of the means for storing data, and where the portion of the means for storing data indicates a UECC error.

The controller is further configured to change a mapping of the SAT to point to the portion of the means for storing data responsive to determining that a corresponding location of the means for storing data has the UECC error. All mappings of the SAT having the UECC error points to the portion of the means for storing data.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device comprising a plurality of jumboblocks (JBs); and
   a controller coupled to the memory device, wherein the controller is configured to:
   determine that a JB has an uncorrectable error correction code (UECC) error;
   update a JB identification (ID) corresponding to the JB in a storage address table (SAT) to point to a bad block without maintaining a UECC list, wherein the SAT comprises a plurality of JB IDs, and wherein one or more JB IDs point to the bad block; and return a UECC message to a requester for the JB responsive to receiving a read command for the JB, wherein the SAT is improved such that read and write operations are optimized.

2. The data storage device of claim 1, wherein the bad block is a write uncorrectable block.

3. The data storage device of claim 1, wherein the bad block is a manufactured bad block.

4. The data storage device of claim 1, wherein the controller is further configured to:

receive the read command from a host device for the JB;

scan the SAT for a logical block address (LBA) associated with the read command for the JB; and return the UECC message to the host device responsive to locating the LBA associated with the read command.

5. The data storage device of claim 4, wherein data of the JB is not read prior to scanning the SAT for the LBA associated with the read command for the JB.

6. The data storage device of claim 1, wherein the controller is further configured to:

determine that a second JB has the UECC error; and update a second JB ID corresponding to the second JB in the SAT to point to the bad block.

7. The data storage device of claim 6, wherein the controller is further configured to:

receive a second read command from a host device for the second JB;

scan the SAT for a logical block address (LBA) associated with the second read command for the second JB; and return the UECC message to the host device responsive to locating the LBA associated with the second read command.

8. The data storage device of claim 1, wherein data of the JB is not moved to another JB.

9. The data storage device of claim 1, wherein the JB ID is not removed from the SAT.

10. The data storage device of claim 1, wherein a UECC list storing logical block address (LBA) to physical block address (PBA) is not scanned for an address translation request.

11. A data storage device, comprising:

a memory device comprising a plurality of jumboblocks (JBs); and a controller coupled to the memory device, wherein the controller is configured to:

receive a read command for data of a JB from a host device;

scan a storage address table (SAT) for a JB identification (ID) corresponding to the JB;

update the SAT to indicate that the JB ID points to a bad block without maintaining an uncorrectable error correction code (UECC) list, wherein the bad block is not the JB; and return, responsive to the updating, a UECC message to the host device, wherein the SAT is improved such that read and write operations are optimized.

12. The data storage device of claim 11, wherein the JB ID corresponds to a logical block address (LBA) provided by the host device in the read command.

13. The data storage device of claim 11, wherein the SAT comprises two or more JB IDs pointing to the bad block.

14. The data storage device of claim 11, wherein the JB ID is not relocated to a UECC list.

15. The data storage device of claim 11, wherein the controller is further configured to:

perform a garbage collection operation on a second JB;

determine that the second JB has a UECC error; and change a pointer in the SAT corresponding to the second JB to point to the bad block.

16. The data storage device of claim 11, wherein the read command is a random read command.

17. The data storage device of claim 11, wherein the bad block is an allocated dedicated block written with write uncorrectable, and wherein the bad block is identified with a UECC error.

18. A data storage device, comprising:

means for storing data; and a controller coupled to the means for storing data, wherein the controller is configured to:

scan a storage address table (SAT) for a logical block address (LBA) corresponding to a read command;

determine that the LBA has an uncorrectable error correction code (UECC) error;

update an entry of the SAT to indicate that the LBA points to a portion of the means for storing data, wherein the portion is a bad block indicating a UECC error; and respond to a host device with a UECC message for the read command.

19. The data storage device of claim 18, wherein the controller is further configured to:

change a mapping of the SAT to point to the portion of the means for storing data responsive to determining that a corresponding location of the means for storing data has the UECC error.

20. The data storage device of claim 18, wherein all mappings of the SAT having the UECC error points to the portion of the means for storing data.

* * * * *